June 2, 1970    A. CAUVIN    3,515,226
TORQUE RESPONSIVE CONTROL SYSTEM FOR MULTIPLE
HEAD SCREW DRIVING MACHINES
Filed Aug. 15, 1967    3 Sheets-Sheet 1

Inventor
André Cauvin
by
Edwin E. Greigg
ATTORNEY

June 2, 1970  A. CAUVIN  3,515,226
TORQUE RESPONSIVE CONTROL SYSTEM FOR MULTIPLE
HEAD SCREW DRIVING MACHINES
Filed Aug. 15, 1967  3 Sheets-Sheet 2

Inventor-
André Cauvin
by Edwin E. Greigg

United States Patent Office 3,515,226
Patented June 2, 1970

3,515,226
TORQUE RESPONSIVE CONTROL SYSTEM FOR MULTIPLE HEAD SCREW DRIVING MACHINES
André Cauvin, Port Marly, France, assignor to Societe des Automobiles SIMCA
Filed Aug. 15, 1967, Ser. No. 660,715
Int. Cl. B25b 23/14
U.S. Cl. 173—12                                    4 Claims

ABSTRACT OF THE DISCLOSURE

A control system for a number of screw driving heads each of which is fixed to a common chamber which provides pressurized fluid to drive separate motors contained in each head. Each screw driving head is fitted with a detachable distributor to control the action of a piston, which piston in turn operates a closing device to control the admission of the pressurized fluid from the common chamber to each head. Each of these detachable distributors is connected to a torque measuring instrument, a general distributor common to each head and to an automatically operated alarm which indicates if the desired torque on each head has been obtained or not. The general distributor is in turn connected to the common chamber and to an operating source of compressed air.

---

The object of the invention is a control system for screwing machines.

It is known practice in industry to employ groups of screwing heads, each group constituting an assembly of several units operating simultaneously. Such assemblies mostly suffer the drawback that the torque applied by each screwing head cannot be regulated accurately, the tightening action being stopped as soon as the tightening mechanism has arrived at a particular position of equilibrium in relation to the screwing head, and not necessarily at the moment when the desired tightening torque is obtained.

The present invention sets out to remedy this drawback by the provision of a control system in which each screwing head is provided with an alarm operated automatically when the desired tightening torque is not obtained at one of the tightening mechanisms. This control system thus provides for the feed, regulation and supervision of each screwing machine, these operations being greatly simplified. In addition, the distributors are so mounted on each screwing head that they can be quickly removed.

The control of any desired number of screwing heads can be provided by a small number of pipe connections.

The space occupied by the invention system is extremely small as compared to the various more complex systems proposed hitherto.

The invention system is reilable in operation, the sequence of operations being ensured, without any possibility of inversion or leapfrogging, by simple mechanisms and direct connections.

The result is a relatively cheap control system.

According to the present invention, each screwing unit is fitted with a detachable distributor, which controls the admission of fluid under pressure to both sides of a piston by which a closing device is operated, the latter serving to control the admission of pressure fluid from a common chamber to each screwing unit. This distributor is connected to an instrument for detecting the torque applied by the screwing unit and to a distributor assembly common to all the screwing units by common ducts serving respectively the feed and the re-setting of the distributor and the supply to an alarm provided on each screwing unit. The distributor assembly is also connected by a duct to the screwing-unit feed chamber and to a source of compressed air.

Other features and advantages of the present invention will become apparent from the following description of one practical form, given solely by way of example and without any limitation of scope being implied, in conjunction with the accompanying drawings, in which.

Figure 4:
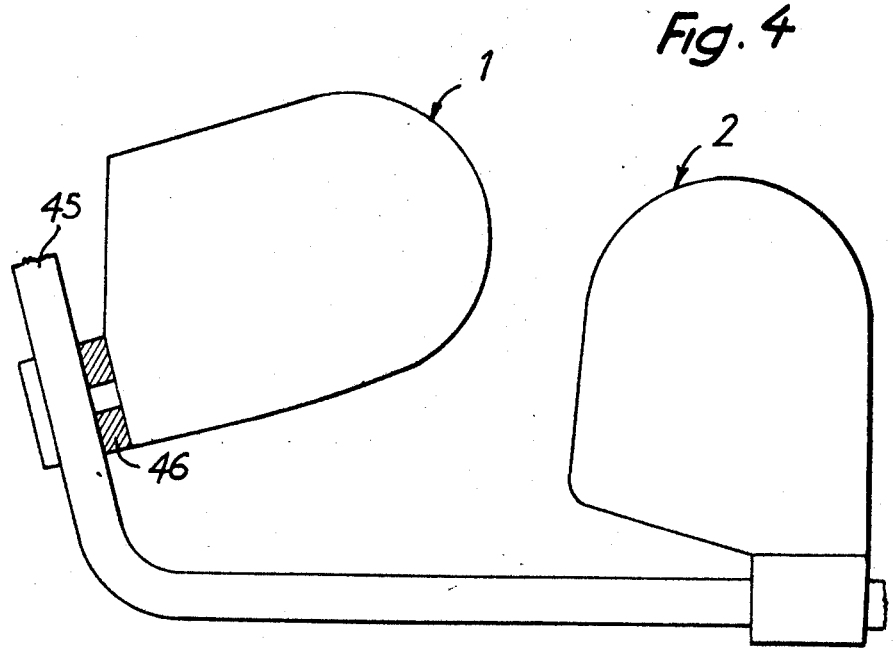
FIG. 4 is a diagrammatic representation of two screwing heads belonging to a group in a screwing machine conforming to the invention.

FIG. 4 includes two screwing heads 1 and 2, of a group constituting a screwing machine. One of these heads 1, is partially shown in FIGS. 1 and 2.

The group of screwing heads such as 1 is supplied with pressure fluid by a common source consisting of a chamber 5, which has two horizontal walls 3 and 4, consisting of plates, between which the fluid is fed from a suitable source, to be described in greater detail hereinafter.

Each of the conventional screwing heads 1 and 2 is connected by a union 6 to be described in greater detail later, to the stub 7 of a casing 8, containing certain members of the control system here proposed. The casing 8, which supports the screwing head, is secured by a nut 9, screwed on to the threaded portion of the casing stub 7, and by a locking washer 10. Where the stub 7 passes through the plates 3 and 4, seals are provided, in particular by rings such as 11 and 12. The assembly formed by the stub 7 and the casing 8 contains a passage 13, drilled axially through the stub 7, for the supply of pressure fluid to the screwing head 1, this passage being in communication with the chamber 5 through the aperture 14. The body of the casing 8 contains a drilled passage 15, constituting an extension of the passage 13. A small chamber 16, is provided between the passages 13 and 15. The latter is carried through to the top face of the casing 8.

The passages 13 and 15 contain a sliding member, 17, which comprises a piston, 18, to which reciprocating motion within the chamber 16 can be imparted and which may be fitted with a ring seal at 19. Within the sliding member 17 is a plunger, 20, one end of which carries a valve head, 21, forming a sliding fit within the bore 13. The threaded top end 22 of this plunger is screwed into a corresponding tap in the bore of the sliding member 17, the nut 23 serving to lock it and to determine the relative positions of the plunger 20 and the member 17. In the casing 8, one passage 24 and a second passage, 25, respectively provide communication between the upper and lower faces of the piston 18 and a conventional-type inverting distributor, 26, forming part of the casing 8. The function of this distributor will be described later. A feed duct, 27, common to all the screwing units of the machine, is connected by a passage indicated diagrammatically at 28 to the distributor 26 and to re-setting passage, 29, likewise common to all the screwing units and connected by the passage 30 to the distributor 26. In addition, the pipe 31, connected at 32 to the distributor 26, leads by way of the connecting hose 33 to a torque detector, 34 (FIG. 1) provided in the screwing head 1. This detector is described in French Pat. 1,431,756 issued on Jan. 28, 1955, as well as in the addition thereto dated Dec. 16, 1965.

In the example illustrated, the pipe 31 is carried through the plates 3 and 4 of the chamber 5 by a sleeve, 35, made fluid-tight by the sealing rings 36 and 37 and secured in place by spring washers or clips 38 and 39. As described in the French Pat. 1,431,756 and the addition thereto, the signal transmitted through the pipe 31 and emitted by the torque detector 34 consists of connection to the open air, as indicated hereunder, this occurring directly the tightening torque is reached.

Near its upper end, the plunger 20 contains a peripheral groove, 40, the width of which is sufficient to provide communication between two passages, 41 and 42, when the plunger is at the top of its stroke, irrespective of the position to which the plunger is adjusted in relation to the sliding member 17. The passage 41 leads to an alarm device providing an audible signal, for example, this alarm consisting, by way of illustration, of a simple vibrator plate, 43, fixed by the screw 44 to the outside of the casing 8; the passage 42, on the other hand, leads to an alarm feed duct, 45, common to all the screwing heads on the machine.

Figure 2:
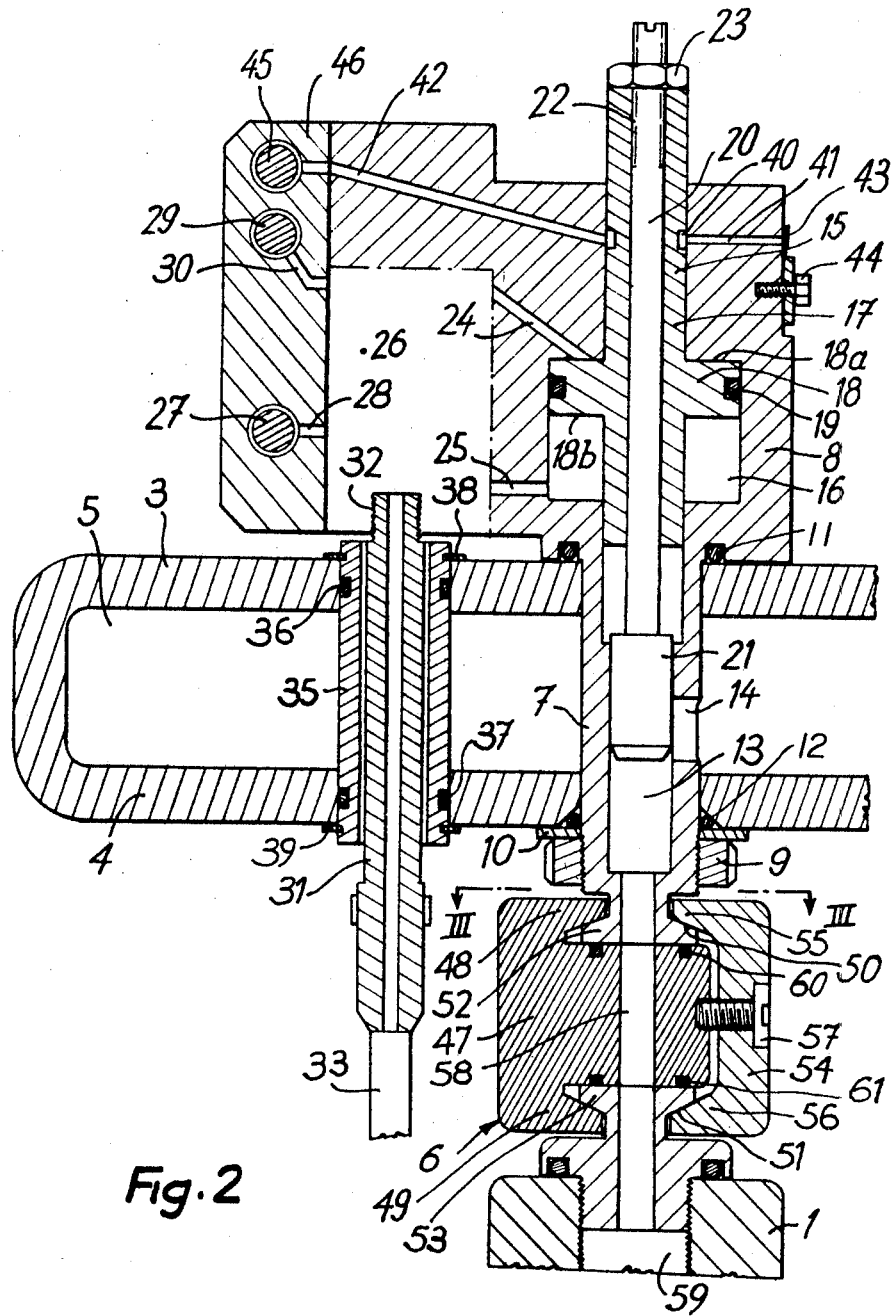
FIG. 2 is a sectional view of the screwing machine on which the mechanism controlling one screwing head is mounted.

As will be explained when the mode of operation of the invention system is described, the assembly 41–44 constitutes a safety device, which is required to operate if, owing to an operational fault, the combination of member 17 and plunger 20 should remain "up" (as shown in FIG. 2), tightening torque not having been attained.

It will be noted from the foregoing that, according to an important feature of the invention, the pressure-fluid feed ducts 27, 29 and 45 are common to all the units in the group. At each screwing head, they pass through a connection block, 46, attached by conventional means to the casing 8 and containing the requisite interconnection passages. This arrangement is far simpler than that now used with multiple screwing machines and in which the feed is provided by a number of separate pipes for each screwing head. When it is desired to detach the casing 8, it is no longer necessary to disconnect the pipe connections; one need only disconnect the means of attachment provided between the block 46 and the casing 8.

Figure 3:
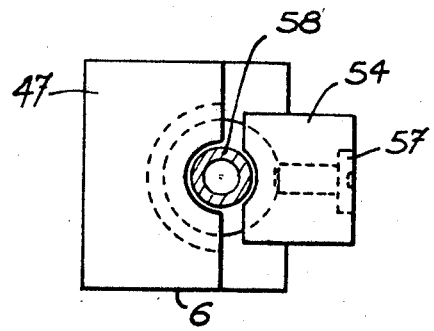
FIG. 3 is a section along the line III—III in FIG. 2.

In accordance with another feature of the invention, the assembly consisting of the casing 8 and the stub 7 is connected to the screwing head 1 by a detachable union, 6, as already mentioned. This union 6 consists of a shackle, 47, shown in FIGS. 2 and 3. The top and bottom parts 48 and 49 of the shackle 47 are shaped to fit cones, 50 and 51, provided respectively on the connecting member 52 of the stub 7 and on the connecting member 53 of the screwing head 1. A saddle, 54, the claws 55 and 56 of which are likewise shaped to fit the cones 50 and 51, is tightened to the shackle 47 by the screw 57. As is obvious from the drawing, because of the conical shape of the contact faces—namely those of the cone 50 and the claw 55, along with the inner face of the part 48, on the one hand, and those of the cone 51 and the claw 55, along with the inner face of the part 49, on the other hand—that the action of the tightening screw 57 will tend to draw the screwing unit 1 towards the connecting member 52, ensuring a stable connection and a good seal. Finally, a passage or duct, 58, within the shackle 47, places the passage 13 in communication with the inlet 59 of the screwing unit. To provide fluid-tightness, in the example illustrated, two packing rings, 60 and 61, have been provided between the upper and lower faces of the shackle 47 and those of the corresponding connecting members 52 and 53. By simply undoing the screw 57 and swinging the saddle 54 through 90° either way, one can separate the screwing unit 1 from the whole, for the purpose of repair or replacement, for instance, without disconnecting other components.

Figure 1:
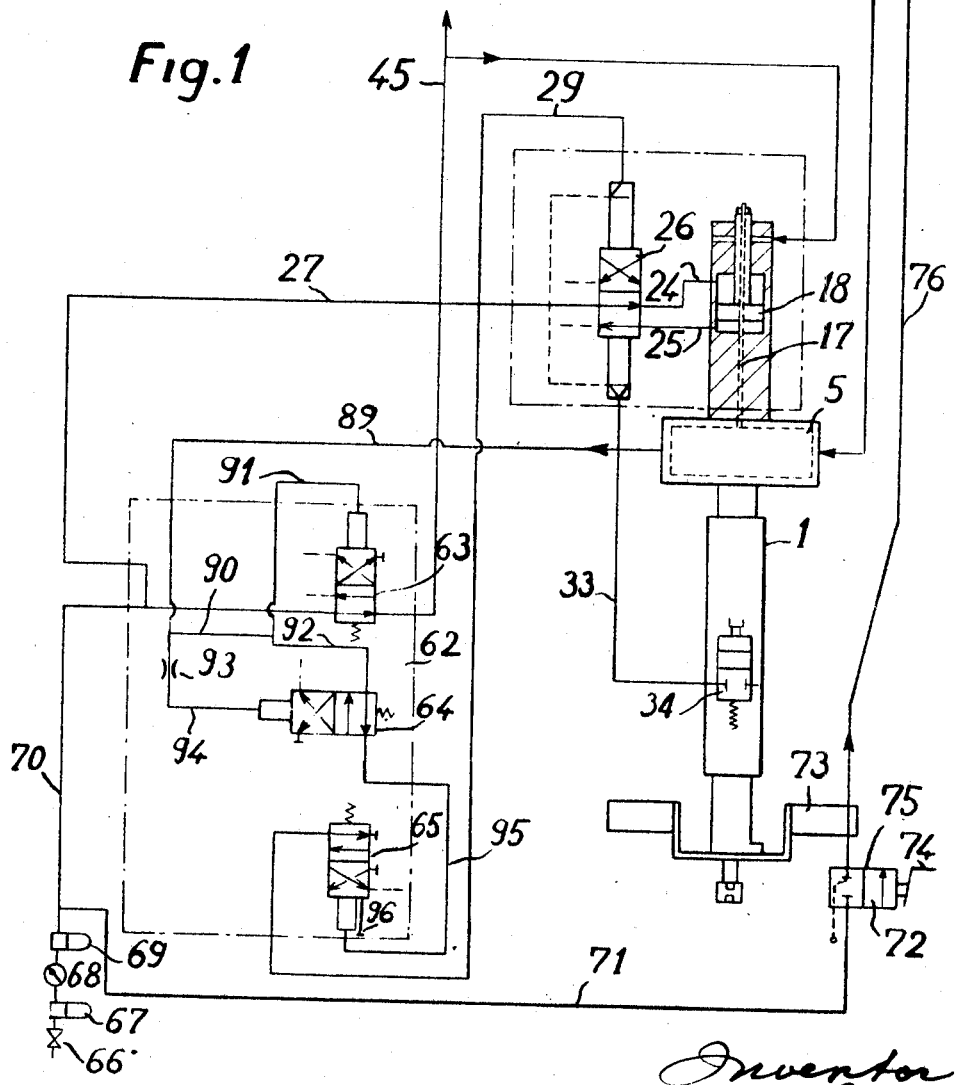
FIG. 1 is a diagrammatic layout drawing of the control system here proposed.

The distributor 26 may be of any known type and has therefore been shown diagrammatically in FIG. 1 by the recognized international symbols.

In one particular position of the distributor 26, shown in FIG. 1, the upper face 18a of the piston 18 is supplied with pressure fluid through the passage 24, while the underside 18b of the piston is acted on by atmospheric pressure through the passage 25. Conversely, with the distributor 26 in the other position shown in FIG. 2, the upper face 18a of the piston 18 is in communication with the atmosphere, while the underside 18b is acted on by pressure fluid. Movement of the piston 18 from one position to the other is brought about by one of its faces being placed in communication with the atmosphere, either by way of the duct 29 or of the pipe 31 and 33, the latter leading to the torque detector 34, which, as regards its distributor, is likewise represented by international symbols.

In accordance with a very important feature of the invention, the screwing units of the machine fed by the common chamber 5 have their control supplemented by a common distribution assembly, shown diagrammatically in FIG. 1, where it is numbered generally 62.

This distribution assembly comprises essentially three distributors, 63, 64 and 65, of a type well-known in commerce as "pilot distributors." These are shown diagrammatically in the drawing by the accepted international symbols. The function of the assembly 62 will become more clearly apparent later, when the mode of operation of the invention is described.

The control system described above is supplemented by feed and control circuits which are well known in themselves and do not form part of the invention, but a brief description of them will provide a clearer understanding of the system illustrated.

Apart from the arrangements already described, a group of screwing units has a control feed, a screwing control that may be manual or automatic and a power feed, supplying pressure fluid to the feed chamber 5.

The control feed comprises a pressure-fluid inlet, 66, a filter, 67, a pressure reducer, 68, and a lubricator, 69, the delivery side of which is connected both to the pipe 70 and to the pipe 71, which latter runs to the screwing control 72, which is associated by conventional means with one of the hand-grips 73 used by the operator for positioning the screw-action members of the units on the screw components. For greater clarity, the hand-grips 73 have been shown in FIG. 1 preferably as integral parts of one of the screwing units. In the case of a fully automatic machine, on the other hand, these operating handles would obviously be eliminated.

The screwing control consists essentially of a thrust member 74, worked either manually by the operator or automatically and acting on a two-position valve, 75. In one position, shown in the drawing, the feed of pressure fluid through the pipe 71 is cut off and the pipe 76 is open to the exhaust: in the other position, the fluid from the pipe 71 is passed to a pipe 76 leading to the power feed.

The power feed, the arrangements for which are well known, comprises a pressure-fluid inlet, 77, a filter, 78, a pressure reducer, 79, a lubricator, 80, a distributor, 81, and a pipe, 82, connected to the feed chamber 5 of the screwing units. The pipe 76 itself leads to a non-return valve, 83, across which is a branch connection, 84, of variable cross-section, through which a very small flow of fluid can take place in either direction. The assembly 83/84 is connected to the distributor 81 by the pipe 85, from which a channel leads to a regulator, 86. The distributor 81 is moved to its cut-off position by a spring, 87, as soon as the pressure of the fluid arriving through the pipe 85 drops below a given value.

The mode of operation of the control system conforming to the invention is as follows:

The screwing units as a whole are lowered, either by hand or automatically, onto the components to be screwed and the control 74 is operated, fluid being thus directed from the pipe 71 to the pipe 76 and, by way of the valve 83, then fills the regulator 86 and, passing through the pipe 85, operates the distributor 81. The regulator 86 is thus filled with fluid under pressure, which, when the control 74 ceases to operate, can escape only through the restricted passage 84, from which it returns to the two-position valve 75 and escapes through a vent pipe (shown in broken line).

This control and feed assembly is in itself familiar and will not be described in greater detail. For a proper understanding of the invention, suffice it to say that the distributor 81 remains open, placing the delivery side of the lubricator 80 in communication with the pipe 82, for as long as the pressure of the fluid supplied through the pipe 85 from the regulator 86 is high enough, in other words until that pressure has been lowered by the escape pipe 84 to such a level that it no longer suffices to overcome the force exerted by the spring 87. The time needed to obtain this pressure drop is so calculated as to be slightly longer than the screwing time.

The fluid thus supplied by the power feed through the distributor 81 is directed through the pipe 82 to the feed chamber 5 of the screwing units.

From the chamber 5, the compressed air passes by way of the pipe 89 to a T-junction 90 or the equivalent thereof, whence it is directed, on the one hand, via the pipes 91 and 92 to the distributors 63 and 64 and, on the other hand, through a constricted pipe, 93, itself connected by the pipe 94 to the distributor 64.

The air applied to the distributor 63, as indicated in the diagram, cuts off the supply through the pipes 70 and 45 to the whistle 43.

The air from the pipe 92 passes through the distributor 64 and is applied through the pipe 95 to the distributor 65, which it operates, placing—through the pipe 29—one end of the distributor 26 in communication with the atmosphere, the upper side of the piston 18 being thereby connected to the atmosphere and its underside, via the pipes 27 and 25, to the pressure. The sliding member 17 then moves upwardly. The head 21 frees the aperture 14 and the air, entering the passage 59 through the union 6, thereupon drives the screwing head.

A brief moment after the commencement of screwing, enough air has passed through the constriction 93 to operate the distributor 64. The pipe 95 is thereby opened to the atmosphere and the distributor 65 resumes the position shown in the upper square in the diagram; the pipe 29 and hence the upper part of the distributor 26, in the diagram, is no longer open to the atmosphere, so that, as will be seen later, this distributor can return to its initial position.

At this stage of operation, the compressed air is still applied to the distributor 63 and the supply remains cut off from the whistle 43.

Once the minimum screwing torque has been attained, the torque detector 34, described in French Pat. 1,431,756 and the addition thereto, to which reference has already been made, brings one side of the distributor 26 under atmospheric pressure, acting through pipes 33 and 31, so that the passage 25 is brought under atmospheric pressure and the passage 24 carries the overpressure. The piston 18 (FIG. 2) then moves to its "down" position and the valve head closes the aperture 14, thus interrupting the supply of the screwing-head turbine. The stopping of the latter is, of course, not strictly instantaneous. The response time and inertia of the parts are such that the time elapsing from the moment when the minimum torque is attained and that at which the screwing actually stops enables the tightening torque to change from this minimum value to one which is nearer to, but still on the underside of, its maximum value.

If, for any reason whatever, the torque has not been attained, the torque detector 34 does not operate. The air continues to escape, through the screwing head, from the chamber 5; but when all the air accumulated in the regulator 86 during one screwing cycle is exhausted, this air ceases to act, through the pipes 89 and 91, on the distributor 63. By the action of its spring, this distributor restores the whistle feed through the pipes 70 and 45; and since, by reason of failure of the sliding member 18 to return to its "down" position, the groove 40 lies opposite the passages 42 and 41, an audible signal is given, drawing the operator's attention to the faulty operation of the screwing head concerned, the sliding member 18 of which, moreover, will be projecting from the casing 8, whereas those of the other heads will be down.

The operator can then stop the audible signal by closing a stop-cock (not shown) and can carry out the necessary checks.

The manual re-setting of the screwing head is carried out with the aid of a push-button or the like, shown diagrammatically at 96, which enables the distributor 65 to be pushed in opposition to its spring and thus opens the upper part of the distributor 26 to the atmosphere.

As regards further details of the machine, the plunger 20 may be adjusted as described hereinbefore to enable the speed of rotation of the screwing head to be regulated precisely by varying the flow through the aperture 14.

Faulty operation of the screwing head will be indicated not only by a visual signal (abnormal projection from the casing 8 of the top of the plunger 20), but also by an audible signal, which can be replaced by a contact which causes a supervisory lamp to glow.

The system with which the present invention is concerned has been described as having pneumatic signalling and re-setting, but electric signalling and re-setting may be employed without going beyond the scope of the invention.

The invention is naturally not limited to the practical example illustrated and described in detail, but includes the possibility of various modifications thereof.

I claim:

1. A control system for screw driving machines having a plurality of screwing heads fixed to a common chamber from which a fluid is fed under pressure to a motor provided in each head to drive screw action components, the combination comprising, a casing associated with said screw driving heads and providing passage means communicating with said common chamber, means defining an opening in said last-named means, piston controlled valve means in each casing controlling the openings in each of said passages, distributor means connected to said common chamber for controlling admission of fluid pressure to opposed sides of said piston, torque detector means for each screw head controlling operation of each distributor, and a common distribution assembly connected to an air supply associated with said distributor means for each screw driving head arranged for supplying fluid pressure thereto and re-setting the distributor means.

2. A control system for screw driving machines as claimed in claim 1, wherein the piston controlled valve means is provided with adjustment means.

3. A control system for screw driving machines as claimed in claim 1, wherein the casing further includes alarm means, said alarm means being actuated by separate fluid passage means under control of said piston controlled valve.

4. A control system for screw driving machines as claimed in claim 3, wherein the common distribution assembly includes three distributors having first and second operative positions with one of said positions being controlled by spring means and the other controlled by fluid pressure from the common chamber, at least one of said distributors being connected to the alarm means and a second of said distributors being connected to the distributor means which controls the piston controlled valve means.

References Cited

UNITED STATES PATENTS

| | | | |
|---|---|---|---|
| 2,953,903 | 6/1960 | Skoog et al. | 81—52.4 X |
| 3,322,205 | 5/1967 | Amtsberg et al. | 173—12 |
| 3,442,177 | 5/1969 | Ulbing et al. | 91—59 |

ERNEST R. PURSER, Primary Examiner

U.S. Cl. X.R.

81—52.5; 144—32